Dec. 20, 1949     W. J. COATS     2,491,953
HAND TRUCK WITH VERTICALLY ADJUSTABLE PLATFORM
Filed Aug. 4, 1947     2 Sheets-Sheet 1
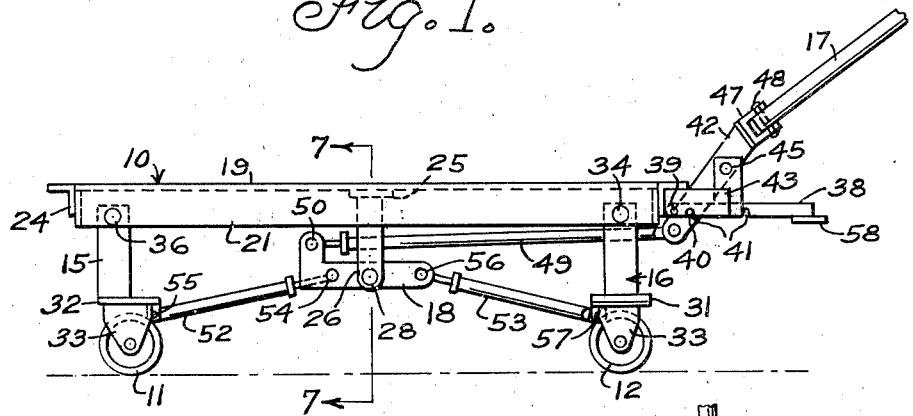
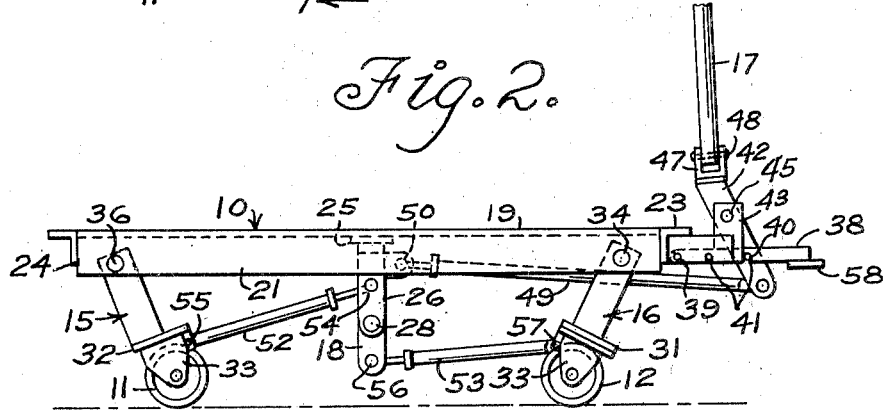
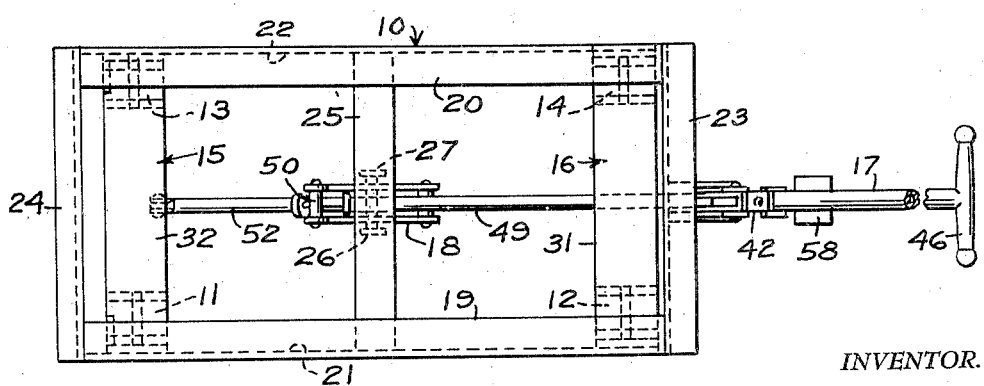
INVENTOR.
William J. Coats
BY Victor J. Evans & Co.
ATTORNEYS

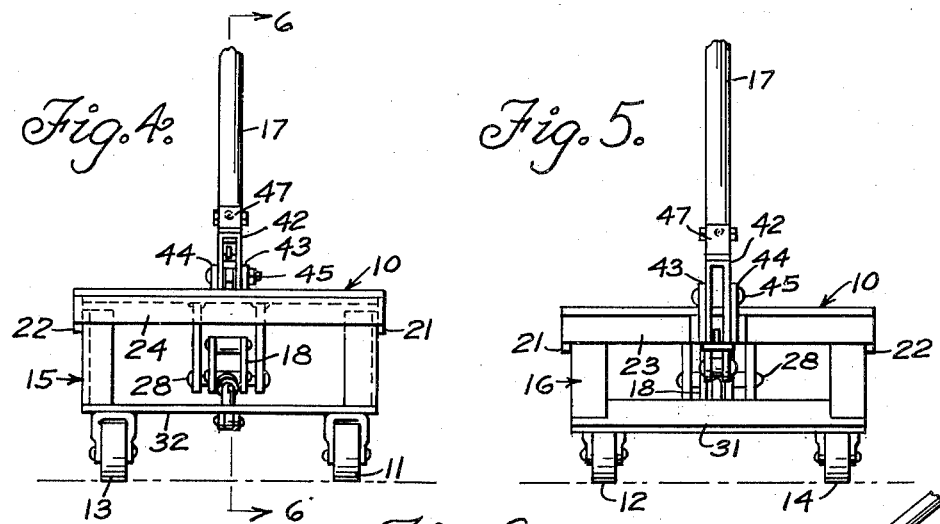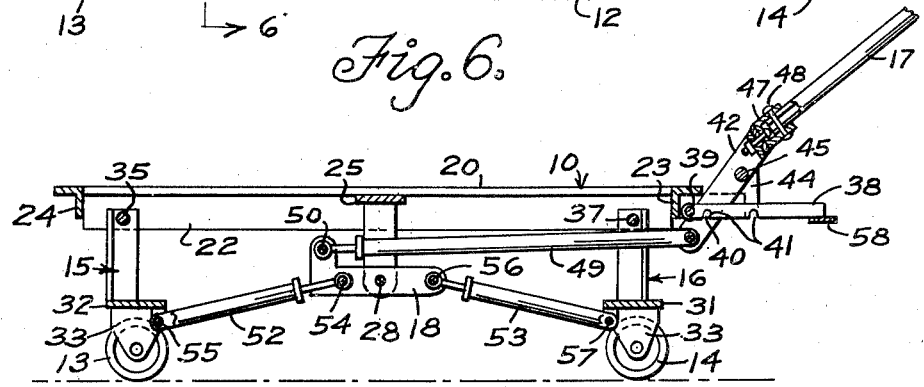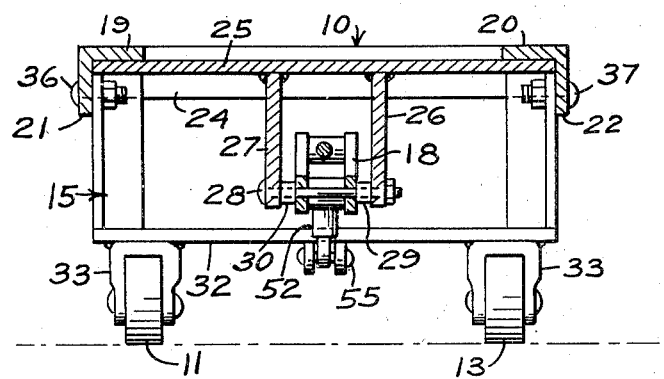

Patented Dec. 20, 1949

2,491,953

UNITED STATES PATENT OFFICE 2,491,953

HAND TRUCK WITH VERTICALLY ADJUSTABLE PLATFORM

William J. Coats, Pomona, Calif.

Application August 4, 1947, Serial No. 766,063

3 Claims. (Cl. 280—44)

This invention relates to manually actuated cargo carrying trucks of the four wheel type and in which the platform is mechanically elevated to pick up the load, and in particular a four wheel truck in which the wheels are mounted in frames pivotally attached to the ends of the platform wherein mechanically actuated instrumentalities operate the wheel mounting frames to upright positions to elevate the platform.

The purpose of this invention is to provide a four wheel truck having a horizontally disposed platform that may be rolled under a cargo carrying pallet and the platform elevated to pick up the pallet with the cargo thereon so that it is not necessary to manually load the truck.

Various types of trucks have been provided with elevating platforms wherein the platforms are actuated with jacks or by hydraulic or pneumatic means, and some have been provided with mechanical lifts, but due to the construction these operate comparatively slow and therefore are not considered practical for universal use. With this thought in mind this invention contemplates a four wheel truck having a combination of levers that may be actuated by the tongue of a handle to move the wheels to elevate or lower the platform.

The object of this invention is to provide means for mounting wheels on the platform of a truck so that the wheels may be folded to lower the platform and readily actuated from the handle to elevate the platform.

Another object of this invention is to provide actuating means for wheel supporting frames of four wheel trucks wherein the wheels may be folded or moved to upright positions to lower and elevate a platform of the truck from a handle at one end of the truck.

Another object of the invention is to provide latching means in a four wheel truck having an elevating platform which locks the platform in an elevated or lowered position.

A further object of the invention is to provide a four wheel manually actuated cargo truck having an elevating platform which is of a simple and economical construction.

With these and other objects in view the invention embodies a horizontally disposed platform having downwardly extending flanges at the sides and ends, wheels having supporting frames with the frames pivotally mounted in the flanges of the platform, a centrally disposed bell-crank pivotally mounted on a hanger suspended from the platform, a handle having a tongue pivotally mounted at one end of the platform, levers connecting the tongue to the bell-crank and the bell-crank to the frames of the wheels, and a latch locking the wheel actuating levers with the platform in a low or elevated position.

Other features and advantages of the invention will appear from the following description taken in connection with the drawings, wherein:

Figure 1 is a view showing a side elevation of the truck with the platform elevated and with part of the handle broken away.

Figure 2 is a similar view showing the platform in the lowered position, and also with part of the handle broken away.

Figure 3 is a plan view of the truck with the parts in the position as shown in Figure 1, and with part of the handle broken away.

Figure 4 is a front elevation looking toward an end of the truck showing the platform elevated and with part of the handle broken away.

Figure 5 is a similar view looking toward the opposite end of the truck showing the platform lowered and with part of the handle broken away.

Figure 6 is a longitudinal section through the truck taken on line 6—6 of Figure 4 with part of the tongue of the handle shown in elevation and part broken away.

Figure 7 is a cross section through the truck on an enlarged scale taken on line 7—7 of Figure 1, and showing the platform elevated.

Referring now to the drawings wherein like reference characters indicate corresponding parts, the truck of this invention includes a platform 10 with wheels 11, 12, 13, and 14, pivotally attached to the platform through supporting frames 15 and 16, and with the wheel frames actuated by a tongue 17 through a bell-crank 18 and suitable connecting levers.

The platform 10 is formed with side angles 19 and 20 providing downwardly extending flanges 21 and 22, and the ends are connected by cross angles 23 and 24. An intermediate bar 25 is also provided across the platform from which the bell-crank 18 is suspended by hanger elements 26 and 27, with the bell-crank pivotally mounted in the lower ends of the hanger on a shaft 28 and with spacers 29 and 30 between the sides of the bell-crank and hanger elements 26 and 27.

The wheel supporting frames 15 and 16 are U-shaped with the wheels mounted on lower horizontal members 31 and 32 with inverted U-shaped brackets 33, and the upper ends of the arms of the frames are pivotally attached to the flanges 21 and 22 by bolts 34 and 35 at one end, and 36 and 37 at the other. The wheel supporting frames are locked in the upright positions as shown in Figures 1, 4, and 6 by a latch bar 38 pivotally mounted on a pin 39 at the forward end of the platform, and held in locking positions by a pin 40 that is positioned to receive notches 41 in the latch bar. The pin 40 is positioned in a yoke 42 that is held between ears 43 and 44 through a bolt 45, and the upper end of the yoke is attached to the end of the tongue 17 of a handle 46 by a clevis 47 in which the end of the tongue is pivoted by a rivet 48. The lower end of the yoke is pivotally connected to a rod 49 and the opposite end of the rod is connected to the upper end of the bell-crank 18 through a pin 50. The upper end of the bell-crank is also connected by a bar 52 to the frame 15 of the front wheels, and the lower end is connected by a bar 53 to the frame 16 of the rear wheels. The ends of the bar 52 are pivotally connected to the bell-crank and wheel frame by pins 54 and 55 respectively, and the bar 53 is connected to the bell-crank and frame of the rear wheels by pins 56 and 57 respectively, as shown in Figure 6.

With the latch bar 38 held on the pin 40 as shown in Figure 6 the wheel frames will be locked in the upright positions, and to release the wheels the latch bar may be raised, or kicked upward by kicking a button 58 on the end thereof upward, and then the handle may be raised to a vertical position which will draw the bell-crank to the position shown in Figure 2, wherein the wheels are folded under the platform, thereby lowering the platform. In this position the truck may be rolled under a pallet loaded with cargo and then the handle drawn downward to elevate the platform so that it will pick up the cargo.

It will be understood that modifications may be made in the design or arrangement of the parts without departing from the spirit of the invention.

What is claimed is:

1. In a manually actuated four wheel hand truck, a horizontally disposed platform having downwardly extending flanges at the sides, U-shaped frames positioned below the platform, means pivotally mounting the upper ends of the U-shaped frames in the flanges of the platform, wheels carried by said U-shaped frames, a handle, a lever pivotally mounting the handle at one end of the platform, a centrally positioned L-shaped bar having a horizontally disposed long arm and an upwardly extended short arm for actuating the wheel carrying frames to upright and folded positions by the handle, rods connecting opposite ends of the long arm of the L-shaped bar to the U-shaped frames, a rod connecting the short arm of the L-shaped bar to the handle actuating lever and means locking the actuating means with the wheel carrying frames in upright and folded positions.

2. In a manually actuated four wheel hand truck, a horizontally disposed platform, frames with wheels on the lower ends thereof positioned below the platform, means pivotally mounting the wheel carrying frames on the under side of the platform, a handle, a lever pivotally mounting the handle on the platform, a centrally positioned L-shaped lever having a horizontally disposed long arm and an upwardly extended short arm, rods pivotally attached to the ends of the long arm and to the wheel carrying frames, a rod connecting the end of the handle to the short arm of the L-shaped lever wherein upward movement of the handle folds the wheel carrying frames under the platform to lower the platform and downward movement of the handle actuates the wheel carrying frames to upright positions elevating the platform, and latching means holding the handle in upward and downward positions.

3. A four wheel hand truck comprising a platform, frames pivotally mounted on the under side of the platform, wheels mounted on said frames, a bell-crank pivotally mounted on the under side of the platform, said bell crank having a horizontally disposed arm and a vertically disposed arm bars connecting opposite ends of the horizontally disposed arm of the bell-crank to the wheel carrying frames, an actuating lever pivotally mounted at one end of the platform, a rod connecting the actuating lever to the vertically disposed arm of the bell-crank, a handle pivotally attached to the actuating lever, said instrumentalities adapted to actuate the wheel carrying frames to upright and folded positions, and latching means holding said instrumentalities with the wheel carrying frames upright or folded.

WILLIAM J. COATS.

REFERENCES CITED

The following references are of record in the file of this patent:

UNITED STATES PATENTS

| Number | Name | Date |
|---|---|---|
| 147,574 | Robinson | Feb. 17, 1874 |
| 1,248,929 | Schubert | Dec. 4, 1917 |